United States Patent Office 3,382,244
Patented May 7, 1968

3,382,244
PHENOLIC COMPLEXES
Wilhelm E. Walles, Midland, Mich., assignor to The Dow Chemical Company, Midland, Mich., a corporation of Delaware
No Drawing. Continuation-in-part of application Ser. No. 40,536, July 5, 1960. This application Aug. 25, 1964, Ser. No. 392,015
8 Claims. (Cl. 260—247.2)

This application is a continuation-in-part of my copending application Ser. No. 40,536, filed July 5, 1960.

The present invention is concerned with phenolic complexes, and is more particularly concerned with complexes of which one member is a phenolic compound of the sort hereinbelow set forth and generically described as a complectate and the other, informally thought of as being the active agent, and called the complectant, in the formation of the complex, is a morpholinone compound.

By the expression "morpholinone compound" there is intended to be designated a member of the group consisting of morpholin-3-one, loweralkyl morpholin-3-one, loweralkenyl morpholin - 3 - one, loweralkenylloweralkyl morpholin - 3 - one, loweralkylidene bis(morpholin - 3- one), the addition polymers of such lower alkenyl morpholinones, and their addition copolymers with ethenically unsaturated copolymerizable substances, including polymeric 4-vinyl-morpholin-3-one, and a co-polymer of 4-vinylmorpholin-3-one with one of 1,3-butadiene, 2,3-dimethyl-1,3-butadiene, isoprene, styrene, p-methoxystyrene, p-carboxystyrene and divinylbenzene.

The unpolymerized morpholinone devoid of polymerizable substituents functions effectively as a complectant in the present invention so do high polymers of polymerizable materials. It follows that the degree of polymerization and related molecular weight of polymers are not critical.

A complectate to be employed according to the present invention is a compound which contains an aromatic nucleus, and a hydroxyl or sulfhydryl substituent upon the said nucleus, optionally with certain further substituents, such compound being herein generically termed arylhydrolowerchalkobenides. This term is used throughout the present specification and claims to designate a member of the group consisting of phenol, thiophenol, naphthol and thionaphthol and the substituted derivatives thereof.

The substituted arylhydrolowerchalkogenides to be used in the present invention can bear, as ring substituents, from one to four members of the group consisting of hydroxy, alkyl, alkenyl, cyclohexyl, loweralkoxy, formyl, carboxyl, phenyl, alkyl(hydroxyphenyl), alkyl (halohydroxyphenyl), hydroxyphenyl, chloro, bromo, iodo, amino, alkyl((phenyl)hydroxyphenyl), and the polyepicyclic groups characteristic of estrone, estradiol, estriol, equilenin, stilbestrol, hexestrol and thelephoric acid.

Representative such compounds include
phenol,
thiophenol,
o-cresol,
m-cresol,
p-cresol,
2,3-dimethylphenol,
2,4-dimethylthiophenol,
2,5-dimethylphenol,
2,6-dimethylphenol,
3,4-dimethylphenol,
3,5-dimethylphenol,
o-ethylphenol,
m-ethylphenol,
p-ethylphenol,
2,4,5-trimethylphenol,
p-stearylphenol,
2,4-dimethyl-6-tert-
  butylphenol,
o-cyclohexylphenol,
m-phenylphenol,
p,p'-dihydroxydiphenyl-
  methane,
2,2'-dihydroxybiphenyl,
2,4'-dihydroxybiphenyl,
3,3'-dihydroxybiphenyl,
4,4'-dihydroxybiphenyl,
1-naphthol,
2-naphthol,
pyrocatechol,
resorcinol,
2,4,6-trimethylphenol,
4-indanol,
o-n-propylphenol,
m-n-propylphenol,
p-n-propylphenol,
2,3,5,6-tetramethylphenol,
o-n-butylphenol,
m-n-butylphenol,
p-n-butylphenol,
p-sec-butylphenol,
p-n-amylphenol,
carvacrol,
thymol,
o-allylphenol,
p-allylphenol,
p-propenylphenol,
hydroquinone,
pyrogallol,
1,2,3-benzenetriol,
phloroglucinol,
m-chlorophenol,
p-bromophenol,
o-iodophenol,
2,4,6-tribromophenol,
o-nitrophenol,
o-aminophenol,
m-aminophenol,
p-aminophenol,
2,5-diaminophenol,
1,3-dihydroxy-4-hexyl-
  benzene,
3-pentadecylcatechol,
1,2-dihydroxy-3-(pentadecenyl-8')benzene,
1,2-dihydroxy-3-(pentadecadienyl-8',11')benzene,
1,2-dihydroxy-3-(pentadecatrienyl-8',11',14')benzene,
2,2'-methylenebis-2,4,6-trichlorophenol,
2,2'-thiobis-4,6-dichlorophenol,
2,4,5-trichlorophenol,
2,2-di(4-hydroxyphenyl)propane,
p,p'-sec-butylidenediphenol,
4,4'-isopropylidenedi-o-cresol,
4,4'-isopropylidenebis(2-phenyl)phenol;
p,p'-(1,3-dimethylbutylidene)diphenol,
p,p'-cyclohexylidenediphenol,
4,4'-isopropylidenebis(2-isopropyl)phenol,
p,p'-sulfonyldiphenol,
2,2'-methylene bis(3-chlorophenol),
2,2'-methylenebis(3,4-dichlorophenol),
2,2'-methylenebis(3,5-dichlorophenol),
2,2'-methylenebis(3,6-dichlorophenol),
2,2'-methylenebis(3,4,5-trichlorophenol),
2,2'-methylenebis(3,5,6-trichlorophenol),
2,2'-methylbenebis(3,4,5,6-tetrachlorophenol),
2,2'-methylenebis(3,4,6-tribromophenol),
and 2,2'-methylenebis(3,4,6-trichlorophenol),
estrone,
estradiol,
estriol,
equilenin,
stilbestrol hexestrol,
3,6-dihydroxy-2,5-diphenylquinone,
3,6-dihydroxy-2,5-di(4-hydroxyphenyl) quinone,
thelephoric acid,
salicyclic acid,
5-chlorosalicyclic acid,
3,5-dichlorosalicyclic acid,
phenylsalicyclic acid,
guaiacol,
salicyl alcohol,
gallic acid,
and protocatechuic acid.

The properties of the hydroxyaromatic and sulfhydryl aromatic complexes of the instant invention differ from the sum of the properties of the starting materials in that such complex derives its physical properties primarily from the complectant member, and its chemical and particularly biochemical properties primarily from the complectate member. Thus, for example, a complex of phenol tends to assume the vapor pressure, solubility in various solvents, and physical state characteristic of the complectant whereas such complex largely retains the chemical in particular the biochemical, such as the germicidal, properties of phenol. The complex exhibits very little of the vesicant and escharotic action of phenol upon animal tissues.

The complexes of the present invention will be better understood by reference to the following examples.

Example 1.—Complex of morpholin-3-one with phenol

Various complexes of morpholin-3-one and phenol are prepared. The complexes differ in the ratio of complectant to complectate. In a first preparation, an aqueous solution containing 9.41 grams of phenol is added, with mixing and stirring, to a second aqueous solution containing 11.51 grams morpholin-3-one. The resulting solution gives almost no odor of phenol. Upon drum drying there is obtained a solid, nearly white, dry, non-crystalline complex of morpholin-3-one and phenol. Infrared spectra of the resulting preparation give no clear evidence of the presence of uncombined phenol and clearly indicate the presence of a complex.

A complex is prepared in all respects similar to the foregoing except that ½ the amount of the complectant is employed. The preparation is examined by infrared spectroscopy. The spectrum of the resulting preparation indicates the presence of uncomplected phenol, and a complex of morpholin-3-one and phenol. The employment of excess complectate results in the preparation of a complex which is impure by reason of uncombined complectate. The preparation has the characteristic odor of phenol, and is moderately hygroscopic.

A complex in all respects similar to the first foregoing complex of the present example is prepared except that one half the stated amount of phenol is employed. The odor of phenol is greatly diminished with the preparation of a colorless solution comprising a complex of phenol with uncomplected morpholinone material. Infrared examination of the resulting preparation indicates the presence of both the said complex and the said uncomplected morpholinone material.

Example 2.—Complex of 4-ethylmorpholin-3-one and phenol

In the present example the complectant is the compound 4-ethylmorpholin-3-one. The complectate is phenol. Phenol (9.4 grams) is melted: into the melted phenol is stirred 11 grams 4-ethylmorpholin-3-one. In the resulting mixture the odor of phenol disappears and there is formed a complex of the said members.

The infrared spectrum of the resulting complex indicates significant shifts in the positions of peaks indicating the carbonyl group of the morpholinone ring.

The complex prepared according to the present example is readily dissolved in water and various organic solvents, and is strongly germicidal.

Example 3.—Complex of polymeric 4-vinylmorpholin-3-one and phenol

In the present example the complectant is a polymer each of whose recurring units is derived from the monomer 4-vinylmorpholin-3-one. The average molecular weight of the polymer is represented by the K-value according to Fikentscher of 27. The complectant polymer is a bland, water-soluble flaky, innocuous solid, hyaline as a continuous solid and yellow-white in granular mass. Its water solutions are relatively viscous.

To a water solution containing 10 percent of the said complectant by weight of resulting solution is added, as complectate, an equal amount of a similar 10 weight percent solution of phenol. Each starting material is readily and completely water soluble. The phenol solution is added to the complectant solution all at once, with stirring. There is promptly formed a white, water-slurried semi-soluble solid complex. Upon further stirring the solid component of the slurry tends to conglomerate to form a coherent mass. Thereafter, the complection mixture is filtered to separate the solid complex product, which is found to be a hygroscopic cohesive nearly odorless solid which is deformed readily under pressure. Removal of bound water to obtain a palpably dry product is not readily accomplished.

The liquid filtrate from which the insoluble complex product is removed is found, upon analysis, to contain a second complex composed of the same members as the first but with a lower relative content of phenol: the second complex is water-soluble, and is isolated in moist form by evaporation of solvent water.

A second such preparation is carried out and the resulting dispersion promptly passed onto a drum drier of which the drum is heated at 170° C. As a result of these operations there is obtained a dry, nearly odorless solid complex of the said components.

The drum-dried complex is studied in detail. It is determined by infrared spectrum analysis that it contains no free phenol, yielding a spectrum the relevant portions of which indicate a structure intermediate that of free phenol and the phenate ion.

Upon prolonged exposure to atmosphere containing not less than 60 percent relative humidity the insoluble complex attracts moisture and tends to dissolves. The complex is practically odorless, indicating a practically complete suppression of vapor pressure of phenol.

The modification is germicidal properties manifest by the present complexes when compared with phenol is evidenced by the results obtained in the following test, known as the agar cup test. Nutrient agar plates of approximately 50 millimeters diameter and a few millimeters depth are prepared and inoculated by swabbing the surfaces thereof with a fresh broth culture of a test microorganism. Through the inoculated surface in approximately the center of the plate, a recess of approximately 12 millimeters diameter is cut and the recess filled with the test compound, using approximately 0.1 gram of chemical substance to be tested. The resulting prepared plate is then incubated for three days under optimum conditions of temperature and humidity to encourage growth of the microorganism. The plates are thereafter examined for evidence of development, around the recess, of a zone wherein growth of the microorganism is inhibited. Numerous complexes and compounds are thus tested. Check plates are similarly prepared and treated but without introduction, to the cut recess, of any chemical substance. In such test, phenol uniformly produces a zone of inhibition of from 15 to 20 millimeters radius, the limit of the agar plate. The complexes of the foregoing examples also give inhibition in a reduced zone of varying radius, usually less than half the radius of the agar plate. Within this zone, the microorganisms are completely inhibited, but such inhibiting action is confined to the said reduced zone. The results of the said test are essentially uniform and consistent when applied to the pathogenic bacteria *Staphylococcus aureus* and *Salmonella typhosa* as well as to the fungi, *Penicillium digitatum* and *Aspergillus niger*. Thus it is evident that the complex according to Example 1 exhibits a bacteriostatic and fungistatic action comparable with that of the phenol starting material but more readily restricted in distribution in an essentially aqueous, semi-solid medium. The complex is thus better adapted than the phenol starting material to be applied germicidally in defined areas for many surficial and topical applications. It is, moreover, less irritating and less odorous.

The procedures of the present invention lead to a process useful in the waste-disposal and related chemical arts. As will be clearly apparent from the teaching hereinbefore, an insoluble complectant which may be a cross-linked copolymeric complectant sub-divided, as by grinding or tabletting to any desired degree of particulate sub-division, may be employed as an absorption bed. Waste fluids such as waste waters or gases carry phenolic, cresylic, and like aromatic hydroxyl-bearing substances, may be caused to pass through such bed, with the result that the phenolic substances become complected and bound with the insoluble complectate and thus removed from the fluid waste. By regulation of bed-depth, particle size, and other factors it is possible to effect removal, to any desirable degree, of phenolic wastes from such fluid waste-bearing effluents. Following such treatment which is regarded as a form of the well-known procedure of "scrubbing," the scrubbed fluid may thereafter be disposed of in known ways. After sufficient use, the complectant substance becomes exhausted as to capacity to form a complex according to the present invention. In such instance, the satisfied complex may be extracted with an organic solvent, as, for example, methylene chloride, whereby to strip off phenolic complectate and regenerate the capacity of the complectant to scrub further waste. The thus released complectate may, if desired, be recovered from the resulting solvent solution and thereafter employed in any suitable manner.

A further beneficial practice which the present invention makes possible is the employment of phenol in the decontamination of water known to contain or suspected of containing living organisms deleterious in drinking water. In this embodiment, phenol is added to such contaminated water in an amount sufficient to destroy pathogenic microorganisms. Upon completion of the destruction of the microorganisms, the water may be passed through one or a succession of filtration beds comprising an insoluble complectant according to the present invention, whereby the phenol may be complected, bound, and removed quantitatively from the water. The resulting purified water may then be used in any way in which water of the same general properties and containing no living microorganisms is to be employed. Phenolic germicidal complectate agents other than phenol having a similarly useful action may also be employed.

Yet another useful aspect of the instant invention is the employment of the present complectant substances in the preparation of complexes for protection from chemical injury caused by a complectate substance. An example of this practice is in the protection of human skin from phenol burns. A person whose skin might be exposed to injurious concentrations of phenol may apply, in advance of such anticipated exposure, a protective coating comprising a bland, innocuous complectant of the sort shown to be employed in the present invention. The coating may comprise inert carrying and bodying agents, soaps and the like and other substances. Not only has such coating the effect of providing a barrier between the skin and the phenol, it also has the capacity to form a complex with phenol, which complex is practically harmless.

Similarly, the formation of a complex of the sort described, after exposure to phenol, has the effect of bonding the phenol in a complex according to the present invention and thus inactivating it as a vesicant and escharotic. This action may be embodied in soaps, ointments, washes, collyria, and cleansing preparations comprising a particulate substance such as a gentle abrasive, sand, sawdust, and the like. Thus, subsequent to exposure to an injurious concentration or amount of phenol, upon removal of gross accumulations thereof, the exposed surface may be contacted with an innocuous complectant of the sort described or a composition comprising such complectant whereby to form a relatively harmless complex and interrupt escharosis and vesication.

Polyhydroxybenzenes and polysulfhydrylbenzenes also form complexes with the present complectants; and in such complexes, assuming a general equivalence of the number of morpholinone rings and hydroxy or sulfhydryl groups attached to benzene rings, each such hydroxy or mercapto group may be bound in the resulting complex. As a result of the increased binding, proportional to molecular weight, such complexes tend to be less soluble than the complexes of monohydroxy or monosulfhydryl benzene compounds. However, the physiological properties of the complectates tend to be nearly the same in the morpholinone-type complexes as in the uncomplected form.

The relative proportion of hydroxyl or sulfhydryl groups bound in the resulting complexes is readily ascertained by examination of the infrared spectrum, with special reference to the region indicating the said groups. Generally, the formation of complexes of the present invention is accompanied by a displacement or reduction of the absorption maxima characteristic of such groups; and in some complexes the characteristic spectral features appear to be obliterated.

Among the complectates which are thus employed are resorcinol, hydroquinone, pyrocatechol, pyrogallol, and phloroglucinol, benzene-1,2-dithiol, benzene-1,3-dithiol, and benzene-1,4-dithiol.

Example 4.—Complex of polymeric 4-vinylmorpholin-3-one and 2,4,5-trichlorophenol A solution containing 10 percent by weight of solution of 2,4,5-trichlorophenol in dimethyl formamide is intimately mixed and blended with an equal volume of a 10 percent aqueous solution of polymeric 4-vinylmorpholin-3-one. The resulting mixture is diluted with water at room temperature, whereupon a water-insoluble complex precipitates, and is thereafter recovered by filtration. Examination of the resulting amorphous, white solid complex product by infrared scan establishes the existence of a complex which is practically free of uncombined halogenated phenol.

A complex is similarly prepared employing 2,2'-methylene bis(3,4,6-trichlorophenol) as complectate. The starting 2,2'-methylene bis(3,4,6-trichlorophenol) is of very low solubility in water, a very disadvantageous property in view of its extensive use as a soap germicide. The complex product of the present example is much more readily dispersed or dissolved in water under various conditions than the uncomplected complectate.

Illustrative of the utilities of the complexes according to the present examples is the use of a complex of o-phenylphenol and polymeric 4-vinylmorpholin-3-one comprising complectant and complectate in approximately equimolecular proportions (based upon morpholinone moieties in the polymeric complectant) as surface preservatives for natural articles of food. The method is deemed to be especially adapted to be employed with articles of food of which the integument is not usually eaten. In representative operations, several dozen lemons and oranges, and also eggs are dipped in solutions of said complex leaving the said fruit or the eggs wet with a film of such solution which is thereafter permitted to evaporate to dryness, to deposit a very thin coating of the said complex in air-dried form upon major portions of the surface of the eggs or the lemons or oranges. The articles of food so treated are thereafter exposed, along with similar articles similarly treated but with solutions of uncomplexed o-phenylphenol, to conditions favorable for their spoilage, to determine their susceptibility to spoilage. The complex-treated eggs and the complex-treated oranges and lemons remain in good and edible conditions much longer than, for example, the corresponding articles treated with uncomplexed o-phenylphenol. Untreated checks of the citrus fruit soon show large, spoiled areas.

A complex containing about one third by weight of polymeric 4-vinylmorpholin-3-one and about two thirds by weight of total complex of 2,4-dibenzoyl-1,3-resorcinol is prepared, and tested as a light and heat stabilizer by inclusion in a vinylidene chloride polymer latex, films prepared of which are slit and curled longitudinally to prepare weaving fibers using a technique disclosed in U.S. Patent 2,858,186. The fibers containing such complex as stabilizer, are exposed, under standard conditions and in standardized test procedures, to degradative effects of light and heat, along with similar fibers stabilized by the inclusion, in the parent latex of which they were prepared, of uncomplected dibenzoyl resorcinol; and with other such fibers containing no stabilizer. At the outset, the complex has the distinct advantage of much greater solubility in the aqueous latex dispersion then the uncomplected dibenzoyl resorcinol.

A comparison of the fibers containing firstly the present dibenzoyl resorcinol complex and, secondly, the uncompleted complectate, in amounts supplying the dibenzoyl resorcinol moiety in the same proportion to the weight of the yarn in each instance, shows that the complected dibenzoyl resorcinol is a much more effective stabilizer than the uncompleted form. Moreover, in the complected form the dibenzoyl resorcinol appreciably stabilizes the said fiber from degradation under the influence of heat whereas the uncompleted dibenzoyl resorcinol is virtually without effect against such thermal influence. Good stabilization is obtained when employing the complex in amount equivalent to 2.5 weight percent dibenzoyl resorcinol by weight of latex polymer solids.

As employed, the dibenzoyl resorcinol complex is a thermoplastic hygroscopic resinous material exhibiting many of the properties of a super-cooled liquid, which has no sharp melting or freezing temperature but which shows distinct softening at approximately 180–200° C.

Example 5.—Complex of polymeric 4-vinylmorpholin-3-one and 2,4-dihydroxybenzophenone In the present example, the complectate material, 2,4-dihydroxy benzophenone (which is also known as monobenzoyl resorcinol) is melted by heating to temperatures between its melting temperature of 143° C. and an upper limit temperature of 160° C. At temperatures within this range, there is added to the melted benzophenone complectate approximately an equal weight of dry polymeric 4-vinylmorpholin-3-one complectant. The complectant dissolves in the melted resorcinol complectate, and immediately upon dispersion of the complectant in the melted complectate, a complex is formed. The resulting complex does not give evidence of a definite freezing temperature, but increases gradually in viscosity as the temperature declines until, at an undetermined temperature somewhat above room temperature it becomes palpably solid. This product, upon solidification, is ground to a fine powder in which form it appears white. The complex is not strongly hygroscopic.

Example 6.—Complex of polymeric 4-vinylmorpholin-3-one and 4,4'-thiobis (6-tertiarybutyl m-cresol)

The present example is carried out in procedural steps closely resembling those of the foregoing example. 178 grams (0.5 mole) 4,4'-thiobis(6-tertiarybutyl-m-cresol) is melted and in it is dispersed 52 grams polymeric 4-vinylmorpholin-3-one (approximately ½ gram-mole on the basis of morpholinone moieties.). The polymeric complectant promptly disperses and dissolves in the melted cresol compound with the resulting formation of a complex of which the composition, by weight of resulting complex, is approximately 77.4 percent 4,4'-thiobis(6-tertiarybutyl-m-cresol) and 22.6 percent polymeric 4-vinylmorpholin-3-one. The complex is germicidal.

Example 7.—Complex of polymeric 4-vinylmorpholin-3-one with the laevorotatory stereoisomer of ephinephrine bitartrate The phenolic hormone constituent laevoepinephrine is employed as a complectate in the preparation of a complex according to the present invention. Thirteen grams water are used as solvent for both 3.2 grams l-epinephrine bitartrate and 4.4 grams aqueous 40 percent solution of polymeric 4-vinylmorpholin-3-one having a molecular weight corresponding to the K-number of Fikentscher of 90. The resulting precipitate is separated by filtration from the complection mixture and washed with water to obtain a complex of the laevorotatorystereoisomer of epinephrine with polymeric 4-vinylmorpholin-3-one. The other stereoisomers of the complectate, or mixtures of them, are also successfully employed in preparing the present complexes.

The product of the present example is tested in standard biological assay techniques and found to exhibit the various physiological actions characteristic of epinephrine and, upon the basis of epinephrine content, to be the equivalent of uncomplected epinephrine: but to be of improved stability under degradative influences such as exposure to light and air.

Epinephrine in uncombined form, or as a mineral acid salt such as the hydrochloride also forms a useful complex according to the present invention.

Example 8.—Complex of polymeric 4-vinylmorpholin-3-one and 4,4'-oxydi-α-toluenethiol A complex is prepared by melting (at about 31° C.), as complectate, 4,4'-oxydi-α-toluenethiol corresponding to the formula

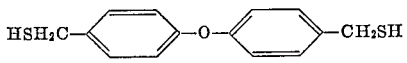

The present complectate is prepared by heating 2,2'-[oxybis(p-phenylenemethylene)]-bis(2 - thiopseudourea) dihydrochloride with sodium hydroxide in aqueous solution at about 90° C. for about 65 minutes, and thereafter acidifying, chilling to solidify the oily bottom layer and thereafter decanting the aqueous supernatant layer and subsequently washing the remaining solid repeatedly with cold ethanol. The said pseudourea starting material is prepared according to the methods set forth in U.S. Patent 2,906,773. To the melted thiol compound is added an amount of polymeric 4-vinylmorpholin-3-one twice equimolecular upon the basis of morpholinone moieties therein. The said complectant disappears in the melted complectate to obtain a complex which is thereafter chilled to solidify, obtaining a glassy solid complex material. The resulting complex has no sharp melting temperature but is solid at temperatures considerably above the melting temperature of the complectate. This is believed to be explained by the cross-linking at the energy levels characteristic of bonding of the present complexes, by the involvement of the thiol groups at the extremities of the molecule of the present complectate, with complectable sites variously disposed within the polymeric complectant. The instant complex is useful as an aquatic herbicide but is relatively non-injurious to terrestrial plants. It differs in various ways from the complectate, notably in suppression of vapor pressure by reason of which the complex is relatively inodorous.

I claim:
1. A complex of morpholin-3-one with phenol.
2. Complex of 4-ethylmorpholin-3-one and phenol.
3. A complex of polymeric 4-vinylmorpholin-3-one and phenol.
4. A complex of polymeric 4-vinylmorpholin-3-one and 2,4,5-trichlorophenol.
5. A complex of polymeric 4-vinylmorpholin-3-one and 2,2'-methylene bis(3,4,6-trichlorophenol).
6. A complex of polymeric 4-vinylmorpholin-3-one and 2,4-dibenzoyl-1,3-resorcinol.
7. A complex of polymeric 4-vinylmorpholin-3-one and 2,4-dihydroxybenzophenone.
8. A complex of polymeric 4-vinylmorpholin-3-one and 4,4'-thiobis(6-tertiarylbutyl m-cresol).

References Cited
UNITED STATES PATENTS

| | | | |
|---|---|---|---|
| 2,812,305 | 11/1957 | Manka | 210—21 |
| 2,930,753 | 3/1960 | McMahon | 210—21 |
| 3,154,544 | 10/1964 | Langdon et al. | 260—247 |
| 3,179,661 | 4/1965 | Blumenkopf et al. | 260—247 |

NICHOLAS S. RIZZO, *Primary Examiner.*

JOSEPH SCOVRONEK, *Examiner.*

E. G. WHITBY, J. TOVAR, *Assistant Examiners.*